United States Patent
Sumida et al.

(10) Patent No.: US 9,624,561 B2
(45) Date of Patent: *Apr. 18, 2017

(54) METHOD FOR PRODUCING AQUEOUS SOLUTION OF PERRHENIC ACID FROM RHENIUM SULFIDE

(71) Applicant: PAN PACIFIC COPPER CO., LTD., Tokyo (JP)

(72) Inventors: Ikunobu Sumida, Oita (JP); Yuji Kawano, Oita (JP); Makoto Hamamoto, Oita (JP)

(73) Assignee: PAN PACIFIC COPPER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/400,028

(22) PCT Filed: May 24, 2013

(86) PCT No.: PCT/JP2013/064516
§ 371 (c)(1),
(2) Date: Nov. 10, 2014

(87) PCT Pub. No.: WO2014/103397
PCT Pub. Date: Jul. 3, 2014

(65) Prior Publication Data
US 2015/0114181 A1    Apr. 30, 2015

(30) Foreign Application Priority Data
Dec. 28, 2012  (JP) ................. 2012-288826

(51) Int. Cl.
*C22B 61/00*   (2006.01)
*C01G 47/00*   (2006.01)
*C22B 1/02*    (2006.01)

(52) U.S. Cl.
CPC ............... *C22B 61/00* (2013.01); *C01G 47/00* (2013.01); *C22B 1/02* (2013.01)

(58) Field of Classification Search
CPC ............ C01G 47/00; C22B 61/00; C22B 1/02
USPC .............. 423/605, 49, 594.15, 593.1; 75/711
See application file for complete search history.

(56) References Cited

U.S. PATENT DOCUMENTS

| | | | | | |
|---|---|---|---|---|---|
| 2,876,065 | A | * | 3/1959 | Zimmerley | C01G 47/00 423/49 |
| 2,967,757 | A | * | 1/1961 | Zimmerley | C01G 47/00 423/49 |
| 2,972,531 | A | * | 2/1961 | Zimmerley | C22B 3/0031 423/49 |
| 3,770,414 | A | * | 11/1973 | Lake | C01G 39/02 423/53 |
| 4,321,089 | A | * | 3/1982 | Kruesi | C22B 4/00 423/49 |
| 2011/0126673 | A1 | | 6/2011 | Dasan et al. | |
| 2011/0229366 | A1 | | 9/2011 | Luederitz et al. | |

FOREIGN PATENT DOCUMENTS

| | | |
|---|---|---|
| GB | 1 282 116 A | 7/1972 |
| JP | 47-21323 | 10/1972 |
| JP | 50-21998 B1 | 7/1975 |
| JP | 62-124240 A | 6/1987 |
| JP | 2-20575 B2 | 5/1990 |
| JP | 2011-117080 A | 6/2011 |
| JP | 62-148327 A | 9/2011 |
| JP | 2011-178573 A | 9/2011 |
| JP | 2012-149285 A | 8/2012 |
| WO | WO 2011/115660 A2 | 9/2011 |

OTHER PUBLICATIONS

Translation of Guo, pp. 142-5, Sep. 2012.*
Translation of Zhang, pp. 210-216, Sep. 2005.*
Heshmatpour et al., "Recovery and Refining of Rhenium, Tungsten and Molybdenum From W—Re, Mo—Re and Other Alloy Scraps", Journal of the Less-Common Metals, vol. 86, Jul. 1982, pp. 121-128.
Machine translation of the corresponding Japanese Office Action dated Oct. 27, 2015 for Application No. 2012-288826.
Chinese Office Action and Search Report, dated Dec. 11, 2015, for Chinese Application No. 201380023747.2, with a partial English translation.
En, "Catalyst Reform Process and Step," China Petrochemical Press Co. Ltd, First Edition, Nov. 2006, p. 628 (4 pages provided).

(Continued)

*Primary Examiner* — Steven Bos
(74) *Attorney, Agent, or Firm* — Birch, Stewart, Kolasch & Birch, LLP

(57) ABSTRACT

A method for allowing production of high-purity perrhenic acid from crude rhenium sulfide by applying a dry process is provided. A method for producing an aqueous solution of perrhenic acid includes 1) a step for roasting rhenium sulfide under an oxygen-containing gas to collect gasified rhenium oxide; 2) a step for cooling and solidifying the gasified rhenium oxide while keeping sulfur oxide entrained in the gasified rhenium oxide a gaseous state, and subsequently performing solid-gas separation, thereby improving purity of rhenium oxide; and 3) a step for dissolving the solidified rhenium oxide into water, or heating and gasifying the solidified rhenium oxide and then dissolving the gasified rhenium oxide into water, to obtain the aqueous solution of perrhenic acid.

14 Claims, 1 Drawing Sheet

(56) References Cited

OTHER PUBLICATIONS

English translation of paragraph 3 on p. 360 of "Metallurgy and Metal Material <Chemical Engineering Encyclopedia> Special Volume," Chemical Industry Publishing House, Jan. 31, 2001, 1 page.
Zhu et al., "Preparation of high-purity potassium perrhenate," Chemistry World, 12th edition, Dec. 1988, p. 534 (3 pages provided).
"Metallurgy and Metal Material <Chemical Engineering Encyclopedia> Special Volume," Chemical Industry Publishing House, Jan. 31, 2001, p. 360, with a partial English translation.
Chinese Office Action with a partial English translation, dated Jun. 1, 2015, for corresponding Chinese Application No. 201380023747.2.
International Preliminary Report on Patentability and English translation of the Written Opinion of the International Searching Authority (Forms PCT/IB/338, PCT/IB/373, PCT/ISA/237), dated Jul. 9, 2015, for International Application No. PCT/JP2013/064516.
Peimin et al., "Highly Effective Use of Metallurgical Material," Metallurgical Industry Press, Sep. 30, 2012, p. 144, with a partial English translation.
Japanese Office Action, dated Aug. 25, 2015, for corresponding Japanese Application No. 2012-288826, with an English translation.
International Search Report, issued in PCT/JP2013/064516, dated Aug. 13, 2013.
Chinese Office Action and Search Report, dated Nov. 11, 2015 for Chinese Application No. 201380023732.6 with partial English translation.
Guo, "Efficient Use of Resources by Metallurgy" Metallurgical Industry Publisher, vol. 2, Section 5.6.3, Sep. 2012, p. 145 (pp. 142-145 provided).
International Preliminary Report on Patentability and English translation of the Written Opinion of the International Searching Aughority (forms PCT/IB/373, PCT/ISA/237 and PCT/IB/338), issued Jul. 9, 2015, for International Application No. PCT/JP2013/064517.
International Search Report, issued in PCT/JP2013/064517, dated Aug. 13, 2013.
Non-Final Office Action dated Mar. 1, 2016, issued in U.S. Appl. No. 14/400,122.
Zhang, "Tungsten-Molybdenum Metallurgy" Metallurgical Industry Publisher, Sep. 2005, pp. 210-216.
Non-Final Office Action dated Aug. 22, 2016, issued in U.S. Appl. No. 14/400,122.

* cited by examiner

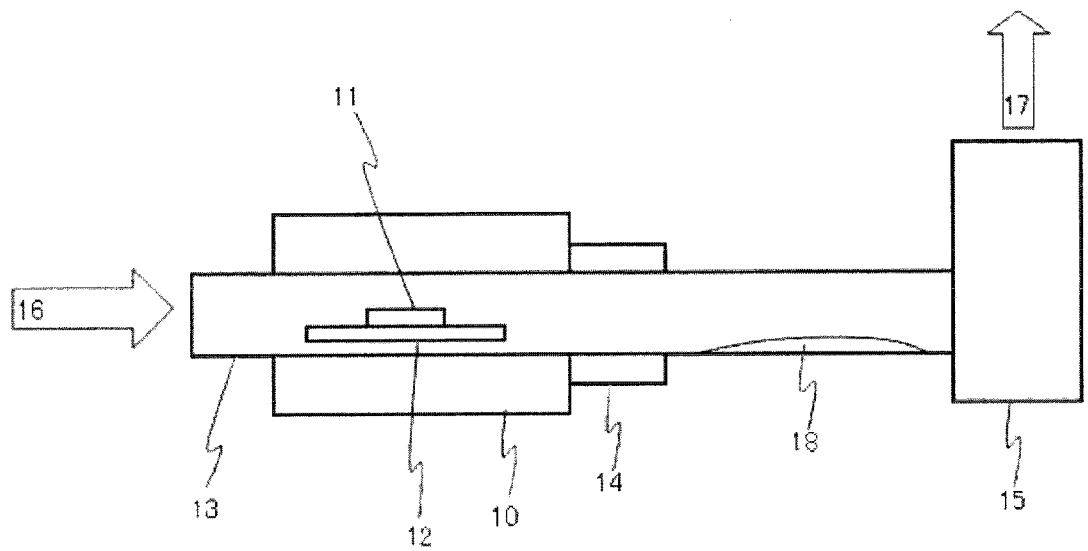

METHOD FOR PRODUCING AQUEOUS SOLUTION OF PERRHENIC ACID FROM RHENIUM SULFIDE

TECHNICAL FIELD

The present invention relates to a method for producing an aqueous solution of perrhenic acid from rhenium sulfide. In particular, the present invention relates to a method for producing ammonium perrhenate from rhenium sulfide through perrhenic acid.

BACKGROUND ART

Rhenium is rare metal slightly entrained in molybdenite, which is molybdenum raw ore, or copper ore. It is important metal used as an element to be added to a catalyst, an element to be added to a thermocouple or a super heat resisting alloy, a high-vacuum electron tube material or the like.

As one of promising raw materials for industrially collecting rhenium, crude rhenium sulfide is exemplified. Zinc, bismuth or the like are typical impurities in the crude rhenium sulfide.

Hitherto, as described in JP-A-S62-148327 (Patent Literature 1), a method for producing potassium perrhenate from crude rhenium sulfide has been known. In the Literature, the crude rhenium sulfide is oxidized and leached using an oxidizing agent such as hydrogen peroxide, and hydrogen sulfide is added to post-leaching solution, thereby obtaining perrhenic acid with high purity in the solution. Then, the potassium perrhenate is produced by adding potassium hydroxide thereto. As described in JP-A-H2-20575 (Patent Literature 2), ammonium perrhenate can be produced from potassium perrhenate by a method of bringing the potassium perrhenate into contact with a cation exchange resin and then neutralizing the resultant material with aqueous ammonia and performing filtration, or the like. The ammonium perrhenate is marketable as a valuable material, and in a high value-added form.

Also, JP-A-S47-21323 (Patent Literature 3) describes a method for producing rhenium, characterized by roasting rhenium-containing molybdenum raw ore, extracting the resulting material with water, adding potassium chloride to this extract, dissolving a thus obtained precipitate into concentrated sulfuric acid, adjusting sulfuric acid concentration to 1 to 3 mol/l and then conducting extraction using an organic solvent containing a high-molecular-weight organic tertiary amine in a concentration of 0.02 mol/l or more, subsequently applying back extraction to this extract with an aqueous solution of caustic potash, and applying concentrated reduction treatment to this extract.

Further, Patent Literature 3 discloses that rhenium is contained in a form of rhenium sulfide, the rhenium sulfide is oxidized and converted into rhenium oxide ($Re_2O_7$) by roasting, the rhenium oxide is vaporized at a temperature of 150° C. or higher, and accumulated in flue dust. The Literature also discloses that, if the flue dust is subjected to extraction with water, the rhenium oxide ($Re_2O_7$) is absorbed into an aqueous solution, and that the aqueous solution contains a large amount of sulfur dioxide or sulfur trioxide, and therefore shows strong acidity.

CITATION LIST

Patent Literature

Patent Literature 1: JP-A-S62-148327
Patent Literature 2: JP-A-H2-20575
Patent Literature 3: JP-A-S47-21323

SUMMARY OF INVENTION

Technical Problem

As described in Patent Literature 1, a method for producing perrhenic acid from crude rhenium sulfide by hydrometallurgical process is known, but provision of a method for producing the perrhenic acid from the crude rhenium sulfide by pyrometallurgycal process is also desired. In this regard, while Patent Literature 3 discloses that rhenium sulfide is oxidized and converted into rhenium oxide by roasting, and that the rhenium oxide is vaporized at a temperature of 150° C. or higher, and accumulated in flue dust, room for improvement has been left for removal of an impurity.

Therefore, an object of the present invention is to provide a method allowing production of high-purity perrhenic acid from rhenium sulfide by applying pyrometallurgycal process.

Solution to Problem

The present inventors have diligently continued study in order to attain the object described above. As a result, rhenium sulfide is roasted, while non-volatile components such as zinc and bismuth are separated as a residue, rhenium is extracted as gasified rhenium oxide. Then, the rhenium oxide is cooled and solidified. A substance of sulfur is entrained in a form of gaseous sulfur oxide, but can be removed by solid-gas separation applying a difference in boiling points. Thus, purity of rhenium oxide to be collected rises. When the rhenium oxide obtained is dissolved into water, an aqueous solution of high-purity perrhenic acid is obtained.

The present invention has been completed based on the findings described above, and in one aspect, the present invention includes:
a method for producing an aqueous solution of perrhenic acid, comprising:
1) a step for roasting rhenium sulfide under an oxygen-containing gas to collect gasified rhenium oxide;
2) a step for cooling and solidifying the gasified rhenium oxide while keeping sulfur oxide entrained in the gasified rhenium oxide a gaseous state, and subsequently performing solid-gas separation, thereby improving purity of rhenium oxide; and
3) a step for dissolving the solidified rhenium oxide into water, or heating and gasifying the solidified rhenium oxide and then dissolving the gasified rhenium oxide into water, to obtain the aqueous solution of perrhenic acid.

In another aspect, the present invention includes:
a method for producing an aqueous solution of perrhenic acid, comprising:
1) a step for roasting rhenium sulfide containing at least one of zinc and bismuth under an oxygen-containing gas to separate the at least one of zinc and bismuth as a roasted residue and to collect gasified rhenium oxide;
2) a step for cooling and solidifying the gasified rhenium oxide while keeping sulfur oxide entrained in the gasified rhenium oxide a gaseous state, and subsequently performing solid-gas separation, thereby improving purity of rhenium oxide; and
3) a step for dissolving the solidified rhenium oxide into water, or heating and gasifying the solidified rhenium oxide and then dissolving the gasified rhenium oxide into water, to obtain the aqueous solution of perrhenic acid.

In one embodiment of the method for producing the aqueous solution of perrhenic acid as related to the present invention, roasting is performed at an in-furnace temperature of 200 to 600° C.

In another embodiment of the method for producing the aqueous solution of perrhenic acid as related to the present invention, the oxygen-containing gas is preheated at 100° C. or higher.

In still another embodiment of the method for producing the aqueous solution of perrhenic acid as related to the present invention, the solidified rhenium oxide is collected on a material insoluble in rhenic acid in the step for cooling and solidifying the gasified rhenium oxide.

In still another aspect, the present invention includes a method for producing potassium perrhenate, comprising using as a raw material the aqueous solution of perrhenic acid obtained by the method for producing the aqueous solution of perrhenic acid as related to the present invention.

In still another aspect, the present invention includes a method for producing ammonium perrhenate, comprising using as a raw material the aqueous solution of perrhenic acid obtained by the method for producing the aqueous solution of perrhenic acid as related to the present invention.

In still another aspect, the present invention includes a method for producing rhenium metal, comprising using as a raw material the aqueous solution of perrhenic acid obtained by the method for producing the aqueous solution of perrhenic acid as related to the present invention.

Advantageous Effects of Invention

The present invention provides a pyrometallurgical process according to which high-purity perrhenic acid can be produced from rhenium sulfide. The present invention can be incorporated into a method for producing ammonium perrhenate from the rhenium sulfide.

BRIEF DESCRIPTION OF DRAWINGS

FIG. 1 is a schematic diagram of roasting equipment used for roasting in Examples.

DESCRIPTION OF EMBODIMENTS

In one embodiment of a method for producing an aqueous solution of perrhenic acid as related to the present invention, the method comprises:
1) a step for roasting rhenium sulfide under an oxygen-containing gas to collect gasified rhenium oxide;
2) a step for cooling and solidifying the gasified rhenium oxide while keeping sulfur oxide entrained in the gasified rhenium oxide a gaseous state, and subsequently performing solid-gas separation, thereby improving purity of rhenium oxide; and
3) a step for dissolving the solidified rhenium oxide into water, or heating and gasifying the solidified rhenium oxide and then dissolving the gasified rhenium oxide into water, to obtain the aqueous solution of perrhenic acid.

In another embodiment of a method for producing an aqueous solution of perrhenic acid as related to the present invention, the method comprises:
1) a step for roasting rhenium sulfide containing at least one of zinc and bismuth under an oxygen-containing gas to separate the at least one of zinc and bismuth as a roasted residue and to collect gasified rhenium oxide;
2) a step for cooling and solidifying the gasified rhenium oxide while keeping sulfur oxide entrained in the gasified rhenium oxide in a gaseous state, and subsequently performing solid-gas separation, thereby improving purity of rhenium oxide; and
3) a step for dissolving the solidified rhenium oxide into water, or heating and gasifying the solidified rhenium oxide and then dissolving the gasified rhenium oxide into water, to obtain the aqueous solution of perrhenic acid.

(Rhenium Sulfide)

Rhenium sulfide to be treated in the present invention may be rhenium sulfide containing no impurity or crude rhenium sulfide containing impurities. It is typically crude rhenium sulfide containing at least one of zinc and bismuth, and more typically, crude rhenium sulfide containing both. In the present invention, "rhenium sulfide" means both the crude rhenium sulfide containing impurities and the rhenium sulfide containing substantially no impurity. An origin of the crude rhenium sulfide is not restricted, but typical examples include crude rhenium sulfide originating from the following.

In waste acid obtained by performing water-wash of a sulfurous acid gas generated from a step for smelting non-ferrous metal such as copper, rhenium which was contained in raw ore is mixed with impurities. Rhenium, bismuth, zinc, mercury, arsenic, iron, copper and so forth are generally contained in such waste acid, The rhenium in the waste acid exists in a form of rhenic acid ($HReO_4$). When the rhenium in the waste acid is allowed to react with hydrogen sulfide, rhenium sulfide is formed and can be collected in a form of powder by solid-liquid separation. At this time, zinc and bismuth do not react with the hydrogen sulfide, and therefore can be separated on a liquid phase.

In order to provide rhenium sulfide containing only a small amount of impurities, the impurities can also be removed by the following methods. For example, the waste acid is passed through a resin having strong adsorbability to mercury, such as a chelate resin and a strongly basic anion exchange resin, thereby allowing removal of mercury. Moreover, the waste acid after removal of mercury is passed through an anion exchange resin to selectively adsorb included rhenium and bismuth onto the resin, thereby allowing removal of arsenic, iron and copper that do not adsorb on the resin. An eluent such as hydrochloric acid is passed through the anion exchange resin on which rhenium and bismuth are adsorbed, thereby stripping of rhenium and bismuth from the anion exchange resin is achieved. Bismuth can be separated from rhenium by chromatography.

In a typical embodiment, according to a chemical analysis (elements other than mercury are determined by ICP-OES and mercury is determined by reducing vaporization absorptiometry), the crude rhenium sulfide contains rhenium: 30 to 66 mass %, sulfur: 8 to 38 mass %, zinc: 0.01 to 1.0 mass %, bismuth: 0.01 to 1.0 mass % and mercury: 0.01 to 1.0 mass %, and in a more typical embodiment, the crude rhenium sulfide contains rhenium: 35 to 50 mass %, sulfur: 25 to 32 mass %, zinc: 0.01 to 0.5 mass %, bismuth: 0.01 to 0.7 mass % and mercury: 0.01 to 0.7 mass %. Occasionally, rhenium may partially exist in a form of rhenium oxide.

(Step 1)

In step 1, rhenium sulfide is roasted under an oxygen-containing gas. By roasting, the rhenium sulfide is considered to be converted into the rhenium oxide according to the following reaction formulas.

$$Re_2S_7(s) + 21/2 O_2 \rightarrow Re_2O_7(s) + 7SO_2(g) \quad \text{(Formula 1)}$$

$$SO_2(g) + 1/2 O_2(g) \rightarrow SO_3(g)$$

As is evident from formula 1, the sulfur oxide is formed as a by-product. The rhenium oxide and the sulfur oxide are gasified and discharged from a roasting furnace. In case where at least one of zinc and bismuth is contained in the roasted residue, these materials are preferably collected in the roasted residue.

Types of furnaces for carrying out roasting are not particularly restricted, and specific examples include a kiln furnace, a fluidized bed furnace and a tubular furnace, but the tubular furnace is preferred for the reason of reduction of contamination due to a scattered residue during collection, and cost.

In order to suppress the reaction in case where in-furnace temperature rapidly rises, provision for supplying an inert gas such as nitrogen and argon into the furnace is also desired.

Specific examples of the oxygen-containing gas include oxygen, air and a mixture of oxygen and inert gas, but use of air is preferred in view of avoiding an increase the cost. The oxygen-containing gas referred to herein includes an oxygen-containing gas existing in a form of gas from the beginning, and also an oxygen-containing gas produced by using solid or liquid (for example, potassium chlorate, ammonium perchlorate) which generates oxygen by heating. The oxygen-containing gas, from a viewpoint of reaction efficiency, preferably supplies oxygen in an amount equal to or more than a theoretical equivalent to be required in the above (formula 1). For example, it can be adjusted to 1.2 times or more, and more preferably, 1.8 times or more as much as the theoretical equivalent.

In order to promote gasification of rhenium oxide, the rhenium oxide is desirably roasted by setting up relatively high in-furnace temperature in the roasting furnace. However, if excessively high temperature is set up, zinc or bismuth might also be gasified, and therefore the rhenium oxide is roasted by adjusting the in-furnace temperature in the roasting furnace, preferably, to 200 to 600° C., more preferably, to 300 to 550° C., and still further preferably, to 350 to 500° C. Moreover, although roasting time depends on a scale or structure of the roasting furnace, if the time is too long, energy loss increases, and on the other hand, if the time is too short, volatilization does not sufficiently proceed, and therefore the time is adjusted preferably to 30 to 240 minutes, and further preferably, to 120 to 180 minutes, for example.

The oxygen-containing gas is desirably preheated prior to supply to the roasting furnace. Preheating of the oxygen-containing gas gives an advantage of uniformization of an in-furnace reaction. Specifically, the oxygen-containing gas is preferably preheated to temperature identical with the in-furnace temperature. However, excessive preheating beyond necessity causes energy loss.

For transporting the gasified rhenium oxide, gas piping may be used. The gas piping is preferably heat-insulated to prevent the rhenium oxide from sticking onto a piping inner wall during transportation. If in-piping temperature during heat insulation is too low, the rhenium oxide might be solidified, and therefore the temperature is preferably adjusted to 300° C. or higher. And, from a viewpoint of energy consumption, an increase in temperature beyond necessity is unnecessary, and therefore the temperature is typically 500° C. or lower, and more typically, 400° C. or lower.

(Step 2)

Then, while keeping the sulfur oxide entrained in the gasified rhenium oxide a gaseous state, the rhenium oxide is cooled and solidified, and subsequently subjected to the solid-gas separation, thereby improving the purity of rhenium oxide. The rhenium oxide is desirably cooled and solidified at a predetermined cooling place (may be inside the piping or in a container having an inlet and an outlet) in view of an improvement in working efficiency. At this time, the sulfur oxide entrained therein directly passes through the cooling place as gas due to a difference in boiling points, and therefore the purity of rhenium oxide is improved by the solid-gas separation. From a viewpoint of contamination prevention, the solidified rhenium oxide is preferably collected on a material insoluble in rhenic acid, for example, quartz or glass, and can be collected into the piping or container using these materials for an inner wall material. Upon the solid-gas separation, a filter may be installed in order to enhance recovery of rhenium. Specific examples of cooling include methods using spontaneous cooling and heat exchange, but for the reason of simplification of a device, the method using spontaneous cooling is preferably applied.

The rhenium oxide is cooled to 100° C. or lower, and preferably, 80° C. or lower, thereby allowing complete solidification. If temperature is lower than necessary, even the sulfur oxide flowing together with the rhenium oxide from the roasting furnace is liquefied or solidified and then co-collected. Therefore, the rhenium oxide is preferably cooled to a temperature of 50° C. or higher, which is a boiling point of $SO_3$ or higher, in order to completely exclude the sulfur oxide. However, generated sulfur oxide is ordinarily in a form of $SO_2$, and therefore the rhenium oxide may be cooled to room temperature (e.g.: 5 to 30° C.), which is a boiling point of $SO_2$ or higher.

Incidentally, a method for directly obtaining an aqueous solution of perrhenic acid is also considered, in which the gasified rhenium oxide is dissolved into water while cooling the rhenium oxide with water using a wet scrubber or the like. However, even the sulfur oxide is also dissolved into water together with the rhenium oxide by this method, and therefore this method is inferior to the method of solidifying the rhenium oxide from a viewpoint of purity. To give an illustrative example, according to the method of dissolving the rhenium oxide into water, a content of S in the aqueous solution of perrhenic acid increases by about 5 to 10 times in comparison with the content according to the method of solidifying the rhenium oxide.

(Step 3)

In step 3, the solidified rhenium oxide is dissolved into water, or heated and gasified, and then dissolved into water to obtain the aqueous solution of perrhenic acid. The rhenium oxide is considered to be converted into the perrhenic acid according to the reaction formula described below.

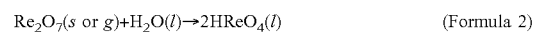

$$Re_2O_7(s \text{ or } g) + H_2O(l) \rightarrow 2HReO_4(l) \quad \text{(Formula 2)}$$

The rhenium oxide is easily soluble in water, but if the concentration in the aqueous solution is too high, the reaction efficiency is considered to decrease. On the other hand, if the concentration is too low, an amount of use of water increases and handling properties during operation are deteriorated, and a concentration step is required thereafter. Therefore, an amount of charge of the rhenium oxide into water is preferably 50 to 500 g/L, and more preferably, 150 to 250 g/L.

A method of bringing the solidified rhenium oxide into solid-liquid contact to dissolve the rhenium oxide into water is simple, but it is also an applicable method that the solidified rhenium oxide is heated and gasified again, and then bringing the resultant gas into gas-liquid contact by a scrubber or the like to dissolve the rhenium oxide into water.

However, the latter method causes loss due to uncollection, and therefore the former method is more preferred.

From the aqueous solution of perrhenic acid, potassium perrhenate and also ammonium perrhenate can be produced by any publicly known method. For example, potassium hydroxide is added to the aqueous solution of perrhenic acid to control pH to about 11 to 13, thereby allowing precipitation of the potassium perrhenate, which can be collected by the solid-liquid separation. Moreover, the potassium perrhenate is heavy and easy to settle, and therefore is preferably subjected to the solid-liquid separation after a floatable impurity is separated. Moreover, the purity can also be improved by elutriation or the like. The potassium perrhenate is reduced with hydrogen or the like, thereby allowing production of rhenium metal (for example, see JP-A-S62-124240).

Moreover, controlling perrhenic acid solution pH to about 7 to 12 by adding aqueous ammonia, the ammonium perrhenate can be precipitated and be recovered by the solid-liquid separation. Purification can be repeated for purity enhancement. Specific examples of the purification methods include a method of performing redissolution into pure water and crystallization. After neutralization, prior to performing the solid-liquid separation, the resultant mixture is preferably heated to 90 to 105° C., and concentrated. Rhenium metal can be produced by reducing the ammonium perrhenate with hydrogen or the like (for example, see JP-A-S62-146227).

EXAMPLES

Examples of the present invention will be described below, but the Examples are for illustrative purpose and the present invention is not intended to be limited thereby.

(Study of Influence of Roasting Conditions on a Ratio of Gasification for Each Component)

Crude rhenium sulfide having analytical values described in Table 1 was prepared. A content of each component was determined by a chemical analysis (analyzed by ICP-OES).

TABLE 1

|  | Re | S | Bi | Zn |
|---|---|---|---|---|
| Content (mass %) | About 48% | About 28% | About 0.1 | About 0.5 |

Then, 500 g of the crude rhenium sulfide was roasted for 120 to 140 minutes under various in-furnace conditions of the kiln furnace, and then the resultant product was cooled to room temperature. As a roasting furnace, a kiln furnace was used, and as an oxygen-containing gas, air was used. In all examples, an oxygen equivalent was adjusted to the range of 1.9 to 2.2. Moreover, it was found that supply of air to the kiln furnace after preheating the air to predetermined temperature (140° C., herein) tended to stabilize in-furnace temperature, and the ratio of volatilization of sulfur rose. The weight of a residue after testing was measured and a chemical analysis of the residue was conducted. A content (g) of each element was determined from the weight of the residue and the results of elemental analysis of each element, and a ratio of gasification was determined from a difference in the content (g) before and after testing.

Roasting time means a period of time from time at which the in-furnace temperature in the kiln furnace reaches predetermined temperature to time at which cooling is started. The oxygen equivalent was calculated on the assumption that rhenium and sulfur contained in the crude rhenium sulfide exist in a form of $Re_2S_7$, or in the form other than oxide, and a theoretical oxygen equivalent in which all of rhenium reacts to $Re_2O_7$ and all of sulfur reacts to $SO_3$ is 1.

As a result, when the in-furnace temperature of the kiln furnace was 100° C. or higher and lower than 200° C., a ratio of gasification of Re was 10% or more and less than 20%, when the in-furnace temperature of the kiln furnace was 200° C. or higher, the ratio increased to 20% or more, and when the in-furnace temperature of the kiln furnace was 350° C. or higher, the ratio increased to 40% or more. A ratio of gasification of S was 10% or more at an in-furnace temperature of the kiln furnace of 100° C. or higher, and the ratio was 80% or more at an in-furnace temperature of the kiln furnace of 300° C. or higher. Therefore, separation of S in a subsequent step was confirmed to be important. In addition, ratios of gasification of Zn and Bi were substantially 0% at an in-furnace temperature of the kiln furnace of lower than 600° C.

(Verification of Effect by Solid-Gas Separation)

Crude rhenium sulfide having analytical values described in Table 2 was prepared. A content of each component was determined by a chemical analysis (determined by ICP-OES).

TABLE 2

|  | Re | S | Bi | Zn |
|---|---|---|---|---|
| Content (mass %) | About 50 | About 20 | 0.01 | 0.01 |

Then, 531 g of the crude rhenium sulfide was roasted using roasting equipment described in FIG. 1 under conditions described in Table 3-1. Then, the resultant product was cooled to room temperature. As a roasting furnace, tubular furnace 10 was used, and as an oxygen-containing gas, air 16 was supplied at a flow rate of 1.5 L/min. In the same manner similar as the example described above, a ratio of gasification of S, a content of S in a roasted residue, a ratio of gasification of Re, a ratio of gasification of Zn and a ratio of gasification of Bi were determined. The results are shown in Table 3-2.

TABLE 3-1

| In-furnace temperature of Tubular furnace | Roasting time | Preheating of air | Oxygen equivalent |
|---|---|---|---|
| 500° C. | 180 minutes | None | 1.5 to 2.0 |

TABLE 3-2

| Ratio of gasification of S | Ratio of gasification of Re | Ratio of gasification of Zn | Ratio of gasification of Bi |
|---|---|---|---|
| 80% or more | 90% or more | 0% | 0% |

Subsequently, a component containing the gasified rhenium oxide was transported in a gasified state at a predetermined distance in tubular furnace external reaction tube insulation part 14 kept at 300° C., and then cooled at a non-heat-insulated part in reaction tube 13 having an inner wall made of quartz, and precipitated as solid-state rhenium oxide 18. Incidentally, gas temperature was in a state in which the gas was cooled to room temperature (about 30° C.) on the way from the insulation part to a scrubber. Sulfur oxide in the gas out of the reaction tube, was absorbed in scrubber 15, and the gas was made harmless and discharged. Reaction tube 13 in which rhenium oxide 18 precipitated was removed, water at room temperature was passed into reaction tube 13 to dissolve the rhenium oxide and to obtain an aqueous solution of perrhenic acid. Each component concentration in the aqueous solution of perrhenic acid obtained was determined by a chemical analysis (determined by ICP-OES), and the recovery of each component when concentration in the crude rhenium sulfide was taken as a standard (100%) was determined. The results are shown in Table 4-1 and Table 4-2.

TABLE 4-1

| Ratio of collection of S | Ratio of collection of Re |
|---|---|
| Less than 1% | 70% or more |

TABLE 4-2

| | Analytical values | | |
|---|---|---|---|
| Unit | Re | S | Bi, Zn |
| Mass mg/L | About 170,000 | 0.2% in concentration based on Re concentration | 0.005% or less in total concentration of both based on Re concentration |

Aqueous ammonium was added to the resulting aqueous solution of perrhenic acid until pH became 9 for neutralization, and then solid-liquid separation was performed to obtain powder of ammonium perrhenate (APR). The results of analysis of the ammonium perrhenate are shown in Table 5. The analysis was conducted by GDMS.

TABLE 5

| | Analytical values | | |
|---|---|---|---|
| Unit | Re | S | Bi, Zn |
| Mass ppm | About 70 (mass %) | About 100 | <1 in total concentration of both |

REFERENCE SIGNS LIST

10 Tubular furnace
11 Sample
12 Sample place
13 Reaction tube
14 Reaction tube insulation part
15 Scrubber
16 Air
17 Exhaust
18 Rhenium oxide

What is claimed is:

1. A method for producing an aqueous solution of perrhenic acid, comprising:
   1) roasting rhenium sulfide under an oxygen-containing gas to collect gasified rhenium oxide;
   2) cooling the gasified rhenium oxide to a temperature of the boiling point of $SO_2$ or higher, and solidifying the gasified rhenium oxide while keeping sulfur oxide, which is entrained in the gasified rhenium oxide, in a gaseous state, and subsequently performing solid-gas separation; and
   3) dissolving the solidified rhenium oxide into water, or heating and gasifying the solidified rhenium oxide and then dissolving the gasified rhenium oxide into water, to obtain the aqueous solution of perrhenic acid.

2. A method for producing an aqueous solution of perrhenic acid, comprising:
   1) roasting rhenium sulfide containing at least one selected from the group consisting of zinc and bismuth under an oxygen-containing gas to separate at least one selected from the group consisting of zinc and bismuth as a roasted residue and to collect gasified rhenium oxide;
   2) cooling and solidifying the gasified rhenium oxide while keeping sulfur oxide, which is entrained in the gasified rhenium oxide, in a gaseous state, and subsequently performing solid-gas separation; and
   3) dissolving the solidified rhenium oxide into water, or heating and gasifying the solidified rhenium oxide and then dissolving the gasified rhenium oxide into water, to obtain the aqueous solution of perrhenic acid.

3. The method for producing the aqueous solution of perrhenic acid according to claim 1, wherein the roasting is performed at an in-furnace temperature of 200 to 600° C.

4. The method for producing the aqueous solution of perrhenic acid according to claim 2, wherein the roasting is performed at an in-furnace temperature of 200 to 600° C.

5. The method for producing the aqueous solution of perrhenic acid according to claim 1, wherein the oxygen-containing gas is preheated at 100° C. or higher.

6. The method for producing the aqueous solution of perrhenic acid according to claim 2, wherein the oxygen-containing gas is preheated at 100° C. or higher.

7. The method for producing the aqueous solution of perrhenic acid according to claim 1, wherein the solidified rhenium oxide is collected on a material insoluble in rhenic acid in the step for cooling and solidifying the gasified rhenium oxide.

8. The method for producing the aqueous solution of perrhenic acid according to claim 2, wherein the solidified rhenium oxide is collected on a material insoluble in rhenic acid in the step for cooling and solidifying the gasified rhenium oxide.

9. A method for producing potassium perrhenate, comprising: adding potassium hydroxide to the aqueous solution of perrhenic acid obtained by the method for producing an aqueous solution of perrhenic acid according to claim 1 to adjust the pH of the solution to about 11 to 13; and
   collecting precipitation of the potassium perrhenate by a solid-liquid separation process.

10. A method for producing potassium perrhenate, comprising: adding potassium hydroxide to the aqueous solution of perrhenic acid obtained by the method for producing an aqueous solution of perrhenic acid according to claim 2 to adjust the pH of the solution to about 11 to 13; and
    collecting precipitation of the potassium perrhenate by a solid-liquid process.

11. A method for producing ammonium perrhenate, comprising:
    adding aqueous ammonia to the aqueous solution of perrhenic acid obtained by the method for producing an aqueous solution of perrhenic acid according to claim 1 to adjust the pH of the solution to about 7 to 12; and
    collecting precipitation of the ammonium perrhenate by a solid-liquid separation process.

12. A method for producing ammonium perrhenate, comprising:
  adding aqueous ammonia to the aqueous solution of perrhenic acid obtained by the method for producing an aqueous solution of perrhenic acid according to claim 2 to adjust the pH of the solution to about 7 to 12; and
  collecting the precipitation of the ammonium perrhenate by a solid-liquid separation process.

13. A method for producing rhenium metal, comprising:
  adding potassium hydroxide or aqueous ammonia to the aqueous solution of perrhenic acid as obtained by the method for producing an aqueous solution of perrhenic acid according to claim 1 to adjust the pH of the solution to about 11 to 13 in a case where potassium hydroxide is added or to about 7 to 12 in a case where aqueous ammonia is added;
  collecting precipitation of the potassium hydroxide or ammonium perrhenate by a solid-liquid separation process; and
  reducing the potassium hydroxide or ammonium perrhenate by hydrogen to obtain rhenium metal.

14. A method for producing rhenium metal, comprising:
  adding potassium hydroxide or aqueous ammonia to the aqueous solution of perrhenic acid as obtained by the method for producing an aqueous solution of perrhenic acid according to claim 2 to adjust the pH of the solution to about 11 to 13 in a case where potassium hydroxide is added or to about 7 to 12 in a case where aqueous ammonia is added;
  collecting precipitation of the potassium hydroxide or ammonium perrhenate by a solid-liquid separation process; and
  reducing the potassium hydroxide or ammonium perrhenate by hydrogen to obtain rhenium metal.

\* \* \* \* \*